United States Patent [19]

Engelsman

[11] Patent Number: 4,470,563
[45] Date of Patent: Sep. 11, 1984

[54] AIRSHIP-WINDMILL

[76] Inventor: Gijsbert J. Engelsman, Boulevard Evertsen 26, 4382 AD, Vlissingen, Netherlands

[21] Appl. No.: 356,483

[22] Filed: Mar. 9, 1982

[30] Foreign Application Priority Data

Mar. 13, 1981 [NL] Netherlands .......................... 8101231

[51] Int. Cl.³ ............................ B64B 1/50; F03D 9/00
[52] U.S. Cl. ........................................ 244/33; 290/55; 415/7; 416/85; 244/115
[58] Field of Search ................. 244/33, 153 R, 155 A, 244/155 R, 115, 116; 290/43, 44, 54, 55; 416/84, 85, 121; 415/7, 5, 2 R; 254/334, 335; 212/71, 81

[56] References Cited

U.S. PATENT DOCUMENTS

| 1,396,489 | 11/1921 | Williams | 244/33 |
| 2,286,547 | 6/1942 | Hutchins | 254/334 |
| 3,779,395 | 12/1973 | Dykeman | 212/81 |
| 3,924,827 | 12/1975 | Lois | 244/153 R |
| 3,987,987 | 10/1976 | Payne et al. | 244/153 R |
| 4,073,516 | 2/1978 | Kling | 244/33 |
| 4,165,468 | 8/1979 | Fry et al. | 290/55 |
| 4,166,596 | 9/1979 | Mouton, Jr. et al. | 416/85 |
| 4,207,026 | 6/1980 | Kushto | 416/84 |

FOREIGN PATENT DOCUMENTS

| 227244 | 5/1909 | Fed. Rep. of Germany | 244/115 |
| 830628 | 2/1952 | Fed. Rep. of Germany | 244/33 |
| 2734282 | 2/1979 | Fed. Rep. of Germany | 244/33 |

OTHER PUBLICATIONS

Biscomb, PCT Application 80/02680, Dec. 11, 1980.

Primary Examiner—Galen L. Barefoot
Attorney, Agent, or Firm—Martin Smolowitz

[57] ABSTRACT

From one or more lighter than air bodies, carrying wind energy catching rotor devices, like windmills, turbines or the like, the caught energy is mechanically transmitted to earth by at least one endless cable-rope transmission. Each of the cables is led over an individual sheave fitted to a turntable on earth (ground, ship, float or so), from which it drives a stationary machine, like a generator or such, and cable guide rolls are provided as needed. All functions of force-transmission, consisting of energy transmission, wind-resistance and upward-floating forces and steering are performed by the turntable through the endless energy transmission cable(s), and no tethering or other force-transmitting cables are applied. In addition a loose, very low tensioned communication line for control, gas supply and the like extends from the turntable to the floating parts. Cable guide rolls are provided as needed. The design aims for a simple installation which avoids cables getting entangled when wind direction changes suddenly or in absolute calm.

13 Claims, 13 Drawing Figures

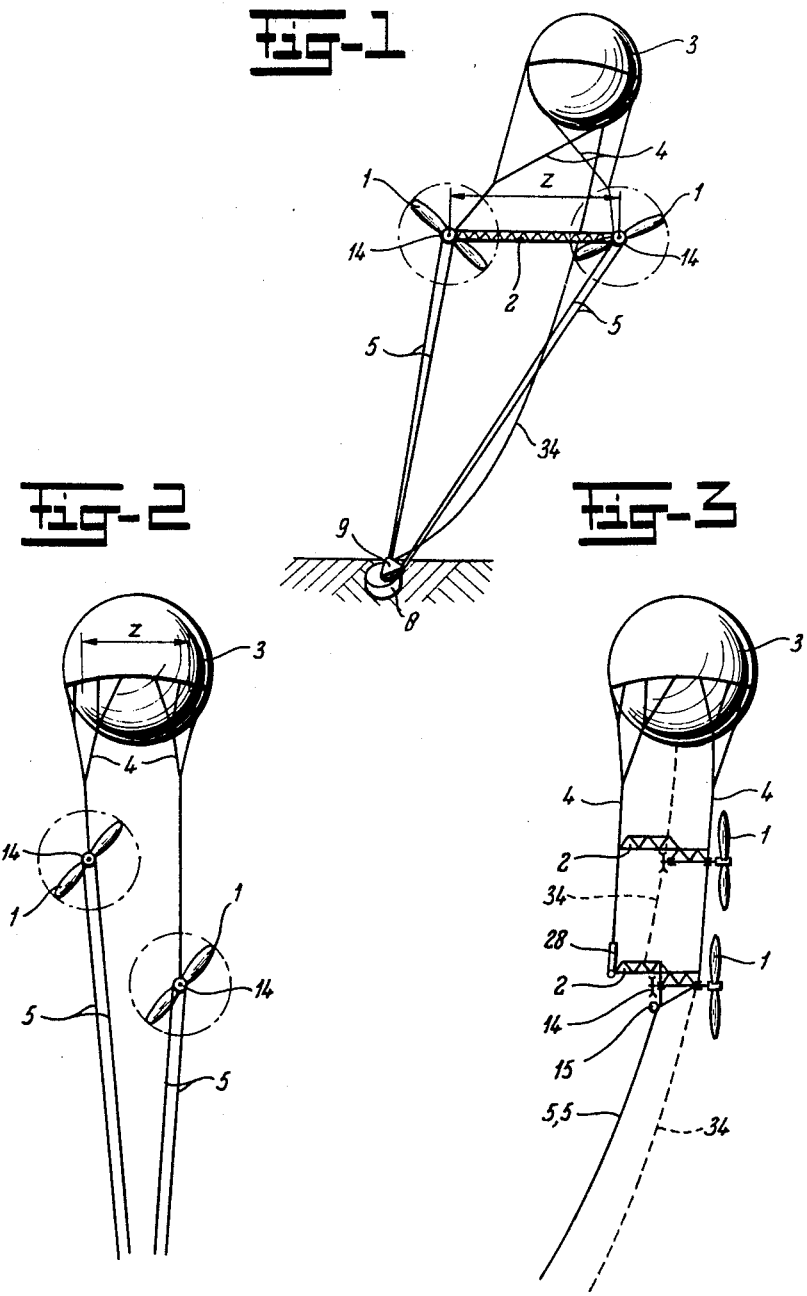

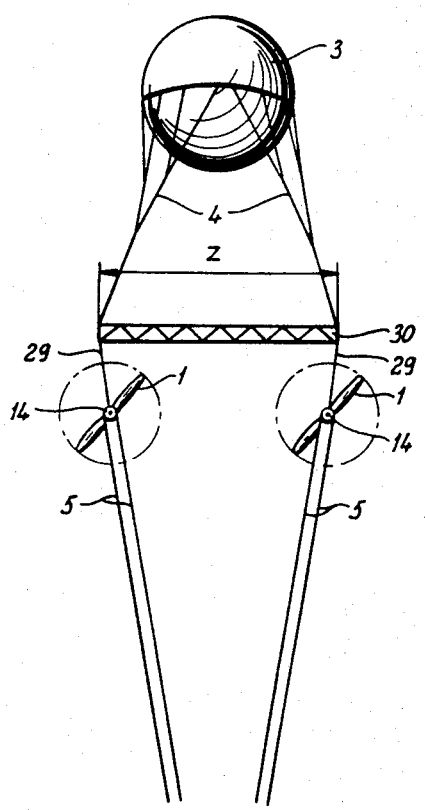
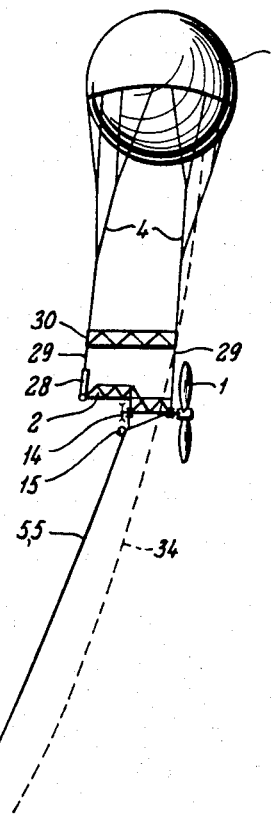
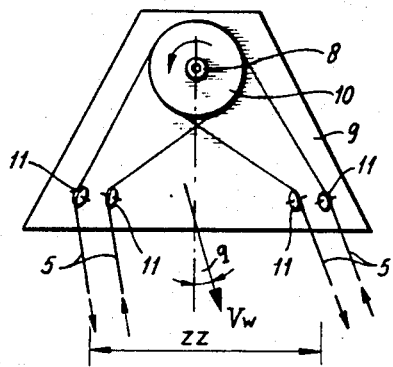
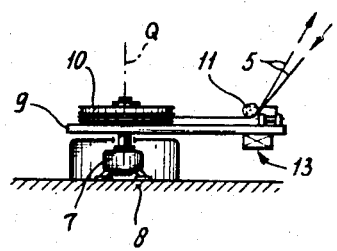

AIRSHIP-WINDMILL

BACKGROUND OF THE INVENTION

The invention is concerned with an installation for catching or abstracting energy from winds, consisting of a wind-catching means carried by one or more lighter than air bodies, like one or more windmills or wind turbines which are fitted to a carrying structure carried by the bodies, and of at least one endless cable-rope-transmission by means of which the caught or abstracted energy is transmittable to the ground, and of a turntable which is pivotably about a substantially vertical pivoting shaft fitted to an anchor point at the ground, which turntable comprises an cable-sheave for each endless cable-rope led over said sheave, which sheave is rotatably carried in bearings on the turntable and is adapted to supply the energy to a driven apparatus, like a generator, pump or the like.

As wind energy-catching means one or more rotors of the windmill-type may be used, but any other type, like a rotor of the Darrieus-type or an endless belt-machine, may be used as well.

In the U.S. Pat. No. 4,166,596 (Mouton c.s.) and installation of the above type is revealed. These and other types of wind energy catching means are furthermore described in chapter 2 of publication Nr. 3.323 (Wind Energy) edited by the Technical University at Eindhoven, The Netherlands. Furthermore, windmills carried by airships or balloons are known from the French patent specification Nos. 995,547 (Franck) and 2,313,577 (Kling).

The known structures have disadvantages as far as the anchoring is concerned. The present invention, making use of only one anchoring point, aims to provide for an always stable position of the airship-windmill, excluding the cables getting entangled or coming to cross each other.

SUMMARY OF THE INVENTION

The above-mentioned airship-windmill installation according to the invention is characterized in that the endless power transmission cable-rope(s) constitute(s) the sole force-transmitting connection(s), which is (are) as well adapted to provide for the steering and the anchoring of the floating part of the installation, in that the first points-of-contact of the cable-rope parts which run between the wind-catching means and the turntable, with the turntable or with parts fitted to the turntable and with the wind-catching means are positioned on a pre-determined horizontal distance to each other.

According to the invention no separate tethering or steering cable, as described in the U.S. Pat. No. 4,166,596, is necessary. In order to have the tethering cable function correctly an appreciable tension should be kept upright in said cable, which reduces that part of the resistance force due to the wind acting on the floating part of the installation to be transmitted by the cable-ropes of the energy transmission to the turntable. Thus the maximum transmittable power is proportionally reduced. The complicated tethering and steering apparatus on the turntable can be omitted as well. Furthermore the generator according to said U.S. Patent Specification is fitted on the turntable, so that the driving-reaction forces will have to be taken up by the tethering cables and by the steering apparatus on the turntable, which forms an additional complication.

Under all circumstances, however, a communication remains necessary for control, communication and/or gas supply between the ground and the floating parts, but this communication, for instance provided by a hose and an electric cable, is only slightly tensioned and its purpose is not to perform a steering or tethering function. According to the present invention, the turntable is provided with a simple compensation means in order to keep said tension in the communication line constant and light.

BRIEF DESCRIPTION OF DRAWINGS

Other characteristics of the invention will be explained in the following description of the accompanying drawings of preferred embodiments which are only given as examples.

FIG. 1 illustrates an installation with two wind energy catching means of the propeller-type and energy transmission with two individual endless cable-rope transmissions and a connection means between the floating parts and the ground for gas transport, control, communication, lightning-conduction to earth and the like.

FIGS. 2, 3, 4 and 5 illustrate alternative carrying structures of the two windmills, FIG. 3 showing a sideview of FIG. 2, FIG. 5 showing a sideview of FIG. 4.

FIGS. 6 and 7 show an anchoring-turntable adapted for use with an installation with two rotors according to FIG. 1, FIG. 7 showing a sideview of FIG. 6.

DESCRIPTION OF INVENTION

Figure 8:
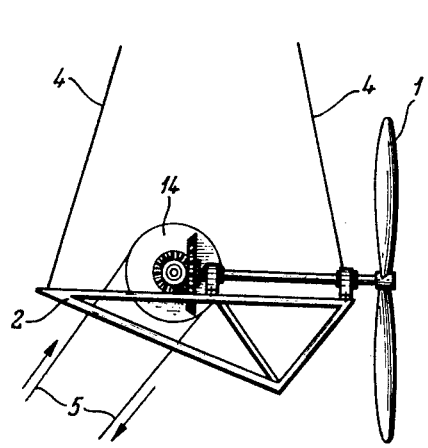
FIGS. 8, 9 and 10 illustrate a variation for the energy transport to the ground, FIG. 10 showing a cross-section along the line X—X in FIG. 9.

The invention aims to install the wind-energy-catching installation in a safe and reliable way in a location with a high mean wind velocity by suspending it to one or more balloons or airships and to avoid the cables getting entangled. Furthermore it is intended that the airborn masses are as small as possible, that the energy is led to the ground in a simple way, that the floating height of the lighter than air bodies and of the wind-catching means is not reduced too much by strong wind, that the angle between the ground and the cables and the angle between the ground and the connection means will not be reduced too much near the anchor point in case of strong winds, and that overload of said connection means is avoided.

FIGS. 1, 2, 3, 4, 5 and 8 all show embodiments of windmills of the propeller-type (1) but other wind-catching means are applicable as well, like for instance Darrieus-rotors. The carrying structure 2 for the rotor 1 is hung from the balloon 3 by means of balloon-cables 4.

The balloon 3 with the rotor 1 is kept in place by one or more endless cable-ropes 5. According to the invention at least one cable 5 is applied, which contacts the carrying structure 2 at least in two different points and which contacts the turntable 9 near the anchoring point 8 in at least two different points, which turntable is pivotable about a vertical axis through the anchoring point 8. The energy supplied by the rotor(s) 1 is transmitted to the ground by one or more endless cable(s) 5 which act as drive belt. Near the ground the cable 5 drives an electric generator or other driven machines by means of a cable sheave with additional guide rolls and/or a gear transmission, which driven machines preferably are not fitted to the turntable. In doing so a light, cheap and efficient construction of the turntable is possible, making energy transmission to the ground simple as well. The cable transmission(s) 5 furthermore serve anchoring purposes of the floating parts of the installation. The whole wind-resistance is thus transmitted to the ground by the same cable-ropes, which also mechanically transmit the caught energy to the ground. An optimal system results, which automatically adapts to the prevailing strength of the wind.

Figure 9:
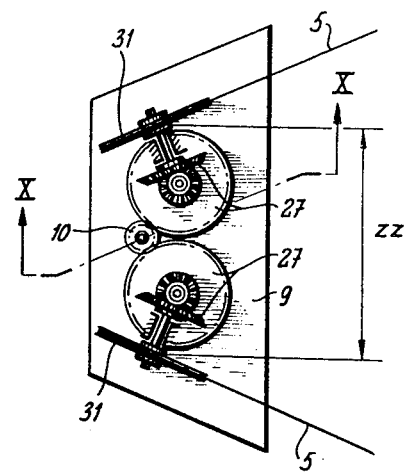

In case of a very low wind velocity or a total calm, the steering action of the horizontal wind resistance forces acting on the floating parts becomes neglectable or disappears and the dangerous situation may occur that the cable parts 5 would get entangled with each other, making future service impossible. Provided a sufficiently large vertical force-component in the cable is available at the turntable 9, entangling will be avoided in case a sufficiently large distance Z exists between the points of contact of the cables at the floating structure as well as a corresponding sufficiently large distance ZZ at the turntable 9 (FIGS. 6 and 9). In FIGS. 1, 2, 4, 6 and 9 this is made possible by the use of twin cable-rope-transmissions 5.

The distance Z is given by the carrying structure 2. Said structure can be positioned such that the blades of the rotor suffer aerodynamically by the repeated passage along said structure, the changing loads being capable to introduce fatigue cracks in the rotor blades, which is the more pronounced in case the blades rotate downwinds with respect to the carrying structure 3. FIGS. 2 and 3 show an embodiment according to the invention, in which the distance Z is provided by the suspension system under the balloon 3; however, the carrying structure 2 for the rotor shaft extends substantially parallel to the rotor shaft and parallel to the direction of the wind, so the wind flow to the rotor blades is no more disturbed by the carrying structure 2, with the exception of a small area around the shaft, which is of minor importance. In FIGS. 4 and 5 a carrying structure 30 is fitted above the rotors in order to create the distance Z, avoiding any disturbance of the windflow by providing a sufficiently large distance between the rotor shaft and the structure 30. The rotor shaft is carried by the sub-structure 2, which is connected to the main carrying structure 30 by means of cables 29.

In an embodiment as illustrated in FIGS. 2 and 3, 4 and 5, part of the carrying structure 2 extends in the direction of the windflow, which reduces the disturbance greatly. According to FIGS. 4 and 5 furthermore the parts of the carrying structure which are placed perpendicular to the direction of the wind are placed outside the profile of the rotors. It is possible to make use of cable-ropes for the greater part of even the whole carrying structure, apart from those parts which directly support the shafts. In doing so flow disturbance may further be reduced.

Figure 10:
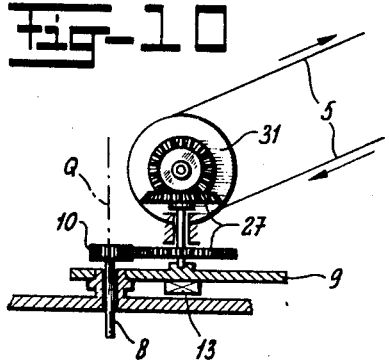
Figure 11:
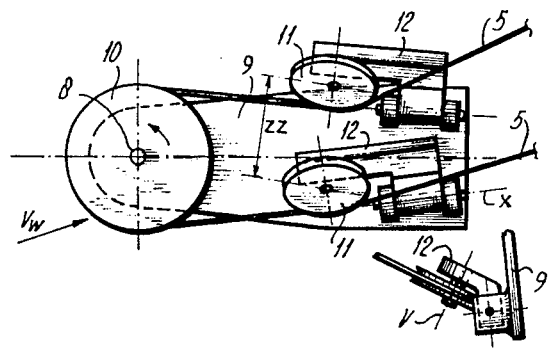
FIGS. 11 and 12 show a turntable for one single endless cable-rope power transmission.
Figure 12:
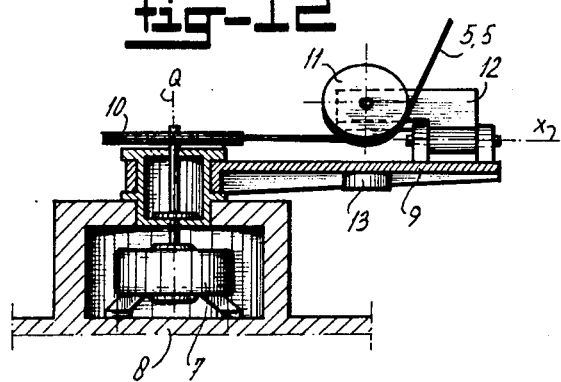

According to a very attractive embodiment of the turn-table 9, a cable sheave 10 is fitted rotatably about the vertical axis Q through the anchor point 8. This sheave 10 is driven by the cables 5, for instance directly through additional guide rolls 11 (FIGS. 6, 7, 11, 12) or by means of a sheave 31 and a gear transmission 27 (FIGS. 9 and 10). When guide rolls 11 are used, they are fitted to the turntable 9 is such a way that both parts of the cable 5 are led in the correct direction to and away from the sheave 10. Each cable part between the guide roll 11 and the sheave 10 should follow a horizontal tangential line with respect to the sheave 10. A preferred embodiment of the guide rolls 11 has a pivoting shaft V fitted to an arm 12 (FIG. 11), in such a way that said arm 12 may pivot about a centerline X which follows the tangential line between the sheave 10 and the guide roll 11, whereas said centerline X also tangents the guide roll 11 in its lowest point (FIG. 11). The guide roll 11 is fitted with means to avoid the cable 5 ever leaving said roll. Balancing weights may be fitted in order to move the center of gravity of the arm 12 with the guide rolls 11 into the centerline of the pivoting shaft X.

The pivoting shafts X of both guide rolls are fitted to the turntable 9. The guide rolls 11 will automatically take the correct position due to the tension forces in the cable parts 5 to provide for the cable running in a correct way to and away from the sheave 10. The same is due for a correct cable motion with respect to the sheave on the shaft of the rotor 1.

The turntable 9 will pivot about the vertical axis Q running through the anchor point 8 until the resultant force of all horizontal components acting on the guide rolls 11 passes through the axis Q. The turntable 9 will automatically adapt its position to a changing wind direction. An angle q may appear between the direction of the wind $V_w$ and the plane of symmetry of the turntable 9, see FIG. 6. The sheave 10, however, will continuously receive energy from the cable(s) 5 in the correct way and pass it on to the rigidly mounted driven machine 7.

The vertical component of the cable forces acting on the turntable 9, which is equal to the lifting force of the balloon(s) 3 reduced with the weights of the carried structures, and which is constant (neglecting the influence of snow and the like), can be counteracted by adapted ballast weights 13 fitted to the turntable 9, in order to reduce load on the pivoting bearings of the turntable 9. The position of the rotor 1 is always downwinds with regard to the anchor point 8. The position of the rotor 1 with regard to the direction of the wind is of importance for a correct functioning. In case of a propeller rotor, the rotation shaft should be substantially parallel to the direction of wind and in case of a Darrieus rotor substantially perpendicular to said direction. Since under changing velocities of the wind the slope of the rotor shaft may change, it may be necessary to apply a control means 28 in the carrying cables 4, 29 of the carrying structure 2 of the rotor shaft (FIGS. 3, 5) in order to keep the rotor shaft substantially horizontal. One or more adjusting means 28 may be applied.

In case of a propeller rotor it may be adapted to the wind velocity by changing the pitch of the propeller blades, in order to maintain a constant speed of the sheave 10 and, for instance, the generator driven by it.

A cablel-rope sheave 14 near the rotor 1 (FIGS. 1, 2, 3, 4, 5) produces a reaction moment in the cables 5. A set of guide rolls 11 near the sheave 10 on the turntable assures a correct running of the cable 5 over the sheave 14. Said guide rolls 15 may again be fitted on a pivoting piece, pivotable about the shaft of the sheave 14. Near the rotor 1 the guide rolls may alternatively be fitted to the carrying structure 2. The forces acting in the cable and on the guide rolls 15, together with gravity forces, the wind-resistance force, the rotor torque and the forces in the balloon cables 4, 29, dictate the position of the carrying structure 2. The carrying structure 2 has to provide the connection between the bearings of the rotor 1 with the cables 4 and 29, extending between the balloon 3 and the cables 5. The carrying balloon 3 should keep the whole structure in the air also in case of leaks, therefore it is preferred to make use of at least two individual balloons. The balloon not only provides for the carrying of the floating structure, but also serves to produce a sufficient pretension in the cable 5 in order to enable it to work as "driving belt". This pretension may be too low for normal service in case one or more of the balloons might produce a lower lifting force due to a leak, but a crash on earth of the structure is avoided. It is preferred to use helium as carrier gas in the balloons with a view to the risk of fire, but the high price of this gas may be prohibitive. The use of the cheap hydrogen is made possible in case at least two balloons 3 are used which are positioned on a safe distance from each other.

If necessary with regard to the ratio between the weight of the floating parts carried by the balloons and the necessary pretension in the cables 5 at the turntable 9, more balloons than two may be chosen.

The balloon should be sufficiently rigid. Between others, this is possible by maintaining a certain overpressure in the balloon, which overpressure should be sufficient to maintain the design-shape of the balloon even under the strongest winds. The volume of the carrying gas in the balloon will vary with changes in ambient air pressure and temperature. It is normal to divide the inside of said balloons into two parts, one part containing the carrying gas, the other part containing air, fitting between the two compartments a flexible diaphragm. At the air side the necessary overpressure is maintained with the help of appropriate means, air being introduced or let out to follow changing ambient conditions. Theoretically the quantity of carrying gas should never need replenishment, but in practice it will probably be necessary to do so from time to time. According to a preferred embodiment, one or more connection means 34 are fitted between the turntable and the floating parts, which connection means should be flexible and light. They may contain a hose for supplying carrying gas, and electric cables for control and communication, as well as to provide for a lightning conductor (FIGS. 1, 3, 5, 13). The connecting means 34 may for instance be necessary to control the pitch of the rotor, to transport energy for heating the balloon and the rotor blades in case of snow and ice. It may be necessary to make use of more than one hose and cable 34.

Figure 13:
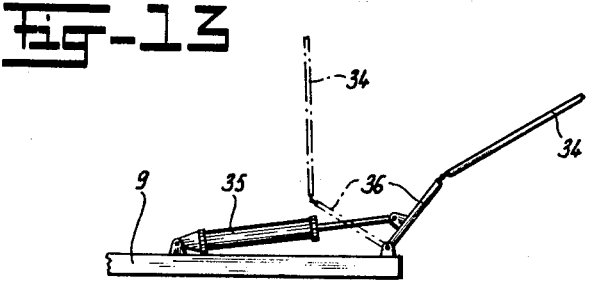
FIG. 13 illustrates a compensation means for the connection means mounted on the turntable.

It is not advisable that the connecting means 34 is subjected to high tensional forces, as is the case with the cable(s) 5. This can be achieved by fixing the connection means 34 to a compensation means 35, 36 (FIG. 13) fitted to the turntable 9, which controls the tension force by corresponding deplacement of the end of the compensation means with regard to the turntable 9. For instance a controlable air pressure or oil pressure in a cylinder 35 may be used or a spring 35, with or without an intermediate lever 36, as shown in FIG. 13. The connection means 34 and the lever 36 are shown in two positions in FIG. 13, a first position with dotted lines in case there is little or no wind and a second position with drawn lines, which applies for a strong wind.

I claim:

1. An airship-windmill installation for catching energy from winds above the ground, comprising:

(a) a wind energy-catching means having a rotatable member carried above ground by at least one lighter than air floating body;
   (b) a carrying structure for said wind catching means carried by said floating body;
   (c) at least one endless cable-rope transmission means by which the caught wind energy is transmittable from said wind-catching means to the ground, and
   (d) a turntable which is pivotable about a substantially vertical axis fitted to an anchor point at the ground, which turntable comprises a cable-sheave for each endless cable-rope transmission means led over said sheave, which sheave being rotatably carried in bearings connected with the turntable and adapted to supply the energy from said endless cable-rope transmission means to a driven apparatus, wherein said endless cable-rope transmission means constitutes the sole force-transmitting connection between the wind-catching means and the turntable, which said cable-rope transmission means is adapted to provide for the sole steering and anchoring of said floating body part of the installation, and wherein the first points-of-contact of the cable-rope transmission means are positioned on the turntable a predetermined horizontal distance from said vertical axis and from each other.

2. An airship-windmill installation according to claim 1, wherein said sheave is fitted to the turntable (9) such that the difference in tension acting in the cable-rope (5) is transformed to a torque in a shaft extending concentrically with the vertical axis of rotation (Q) through the anchor point (8), whereby said shaft is rotatable independent with regard to the pivotable turntable.

3. An airship-windmill installation according to claim 1, wherein at least one connection means (34) is applied between the floating body part of the installation and the turntable (9) and a compensation means (35, 36) is installed between the turntable (9) and the connection means (34) in order to maintain a small tensional force in said connection means.

4. An airship-windmill installation according to claim 1, wherein between the lighter than air body (3) and the carrying structure (2, 30) at least one control means (28) is installed, whereby the wind-catching means is always placeable in the required position with regard to the wind direction.

5. An airship-windmill installation according to claim 1, wherein the carrying structure (2,30) is shaped such that its parts which extend substantially perpendicularly to the direction of wind are positioned outside the profile of the wind-catching means, when viewed in the direction of the airflow.

6. An airship windmill installation according to claim 1, wherein two rotatable wind-catching means are provided separated by a distance sufficient to avoid entangling of the endless cable-ropes.

7. An airship windmill installation according to claim 1, wherein said rotatable wind-catching means is provided at the opposite ends of said carrying structure.

8. An airship windmill installation according to claim 1, wherein said rotatable wind-catching means is a propellor.

9. An airship windmill installation according to claim 1, wherein dual guide rolls are provided attached to said turntable and horizontally separated by a distance sufficient to avoid entangling of the endless cable-rope transmission means.

10. An airship windmill installation according to claim 1, wherein said cable sheave is mechanically connected to an electric generator (7) driven apparatus for producing electric power.

11. An airship windmill installation according to claim 1, wherein a gear transmission is provided on said turntable between said sheave and said driven apparatus.

12. An airship windmill installation according to claim 3, wherein said connection means comprises a hose for supplying gas to said floating body and an electric control cable.

13. An air-ship windmill installation according to claim 2, wherein said sheave means is driven through guide roll means (11).

* * * * *